US005334081A

United States Patent [19]

Calderon

[11] Patent Number: 5,334,081

[45] Date of Patent: Aug. 2, 1994

[54] COMBINATION HOMOGENIZER-VACUUM LOADER FOR MEAT PRODUCTS WITH IMPROVED RING SEAL

[76] Inventor: Alexander Calderon, 45208 S. Grimmer Blvd., Fremont, Calif. 94539

[21] Appl. No.: 826,904

[22] Filed: Jan. 27, 1992

Related U.S. Application Data

[63] Continuation-in-part of Ser. No. 647,462, Jan. 28, 1991, Pat. No. 5,129,316.

[51] Int. Cl.[5] .............................................. A22C 11/02

[52] U.S. Cl. ........................................ 452/35; 452/45; 452/198

[58] Field of Search ...................... 452/35, 30, 45, 198

[56] References Cited

U.S. PATENT DOCUMENTS

| | | | |
|---|---|---|---|
| 3,147,784 | 9/1964 | Sloan | 452/35 |
| 3,892,009 | 7/1975 | Townsend | 452/45 |
| 4,419,790 | 12/1983 | Niedecker | 452/35 |
| 4,955,109 | 9/1990 | Evans et al. | 452/45 |
| 5,097,876 | 3/1992 | Lagares | 452/35 |
| 5,102,094 | 4/1992 | Washam et al. | 452/35 |
| 5,129,316 | 7/1992 | Calderon | 452/35 |

*Primary Examiner*—Willis Little
*Attorney, Agent, or Firm*—Robert Charles Hill

[57] ABSTRACT

A combination homogenizer-vacuum loader for a machine that stuffs meat product into a casing which includes an upright cylindrical chamber that can be evacuated and an agitator assembly that is rotated inside the chamber. An entrance port with a sliding gate valve is located on the side of the chamber so that when the valve is opened, ground meat is drawn by vacuum into the chamber. An exit port is located on the floor of the cylinder. The agitator assembly is detachably mounted on one end of a spindle having its other end external to the chamber for attachment to a drive means. A number of agitator assemblies are provided, each having a configuration designed to homogenize a particular meat product having its own consistency, depending on content of fat, moisture, and fiber. A ring seal features three elastomeric seals operating in combination to provide a reliable vacuum seal between the homogenizing unit and the meat stuffing machine. The homogenizer may be lifted off the meat stuffing machine by actuating a hydraulic ram hingably attached to the homogenizer and base stand.

9 Claims, 6 Drawing Sheets

COMBINATION HOMOGENIZER-VACUUM LOADER FOR MEAT PRODUCTS WITH IMPROVED RING SEAL

CROSS REFERENCE TO PREVIOUSLY FILED APPLICATIONS

This application is a continuation-in-part of Ser. No. 07/647,462 filed Jan. 28, 1991, now U.S. Pat. No. 5,129,316.

FIELD OF THE INVENTION

This invention relates to machines for stuffing meat product into casings and particularly to an adapter to a meat product stuffing machine that provides a very homogeneous meat product stuffed into the casing together with the convenience of vacuum loading.

BACKGROUND AND INFORMATION DISCLOSURE STATEMENT

For many years, meat has been sold as sausages or loaves wherein meat product is stuffed into a casing. The casings were originally the intestine of the animal. In more recent years, synthetic casings have been offered in the market.

In the context of this specification, the term, meat product, is understood to mean a wide assortment of meat preparations, including ground beef, dismembered poultry, etc. These various assortments would obviously present a wide consistency due to variation in content of fat, moisture, size of meat fiber, size of meat chunks, etc.

The quality of the meat product is determined not only by the meat but by the quality and homogeneity of the loaf. Homogeneity is determined by the stuffing process, i.e., how well the meat product is mixed and how effectively air is removed from the meat product which otherwise collects to form voids. In former times, stuffing was performed manually so that inhomogeneity, compared to present standards, was very poor.

As the demand for the number and quality of meat product loaves increased, machines have been developed to stuff the meat product. The first machines, illustrated in FIG. 1, included an air-actuated ram to stuff meat product drawn down from a conical hopper and out through a "horn". The casing is placed over the horn to receive the meat product that is passed through the horn. The upper large rim of the conical hopper is typically twelve feet above the floor so that one of the inconveniences of using this machine is having to lift the meat product up to this height in order to fill the hopper.

As shown in FIG. 2, in the next generation of machines the piston was replaced by a vane pump or small screw, and a vacuum was added adjacent to the horn so that the casing was partially evacuated and the meat product was thereby drawn into the casing.

As shown in FIG. 3, in order to facilitate loading the meat product by not having to lift the meat product up to the rim, machines were developed with an evacuated upper chamber into which meat product was drawn by vacuum. The chamber contained a large screw which directed the meat product toward the chamber exit so that the meat product was stuffed through the horn into the casing using a combination screw and vacuum. Although the vacuum in the chamber helps to homogenize the meat product by withdrawing entrapped air, the use of a large screw (auger) to force the meat product into the exit port compacts the meat product and thereby obstructs the desired homogenizing of the meat product. These machines have the additional problem that fat tends to collect on the blade leading to inhomogeneity of the meat product. The construction of these machines takes frequent cleaning of the screw (necessitated by the collection of fat thereon) which is very time-consuming and inconvenient.

None of the machines discussed in the foregoing paragraphs addresses the problem of preparing meat product and stuffing the meat product into a casing where the meat product has been homogenized to an optimum consistency regardless of the initial condition of the meat product with respect to content of moisture, fat, fiber length, air pockets or gross inhomogeneity.

THE INVENTION

Objects

It is an object of this invention to provide an apparatus for homogenizing meat product to be stuffed into a casing.

It is a further object that the stuffed meat product be much more homogeneous with regard to the distribution of fat and absence of air pockets than is provided by machines of the prior art.

It is another object to avoid the problem of collection of fat on a screw such as experienced with machines of the prior art and to provide an apparatus that is convenient to clean.

It is another object of this invention to provide an agitator to be used in conjunction with vacuum in order to provide homogenization that is superior to that provided by machines of the prior art.

It is another object that the construction of the apparatus be amenable to conveniently interchanging agitators having various styles, each style designed to optimize homogenization of a particular meat product having its own unique consistency.

It is another object to provide an apparatus that may be retrofitted to the old style (top-loaded) meat product stuffing machines to provide convenience of homogenizing loading and homogeneity of stuffed meat product that is superior to machines of the prior art.

It is another object to provide a ring seal device that very reliably vacuum seals the cylindrical exit port of the homogenizer to the cylindrical entrance port of the meat stuffing machine.

It is another object to provide a convenient means for moving the homogenizer between a position where the homogenizer is in contact with the meat stuffing machine to enable transferring the homogenized meat product from the homogenizer to the meat stuffing machine to a second position where the homogenizer is separated from the meat stuffing machine in order to permit cleaning and repairs.

SUMMARY

This invention is directed toward a meat product homogenizer in which meat product is drawn into a vacuum chamber. The chamber has a rotary agitator that stirs the meat product to facilitate removal of entrapped air and mixing of fat homogeneously throughout the meat product. The agitator then directs the homogenized meat product through an exit port to a meat product stuffing machine that comprises a small auxiliary screw or vane pump to force the ground meat through a horn into a casing.

The homogenizer of this invention includes a vacuum chamber containing an agitator which replaces the conical hopper of the prior art machine, thereby upgrading the prior art machine with regard to providing improved homogenization and vacuum loading of meat product.

In its preferred construction, the chamber is cylindrical (oriented in the upright position) and has a bottom floor and top hinged lid. A spindle passes through the floor into the center of the cylindrical chamber. The end of the spindle is a square hub so that various agitator assemblies having a matching square central opening may be mounted onto the end of the spindle inside the chamber. The other end of the spindle extending externally through the floor of the chamber is coupled to a drive motor. The floor of the chamber has a large exit port permitting the meat product to pass from the homogenizer to the loading cylinder of the meat product stuffing machine then out through an exit horn into the casing. The rotating agitator assembly has two sections, i.e., a scraper member and a homogenizing member, both mounted at their respective centers to rotate on the spindle. The homogenizer member mounted above the scraper member directs the meat product toward the rotating scraper member which has a sweeping action against the bottom of the chamber and continually directs the meat product toward the exit port in the floor of the chamber. An entry port is provided on the cylindrical wall of the chamber that has a slide valve that may be opened to permit flow of meat product into the chamber. A lid covers the entire top end of the chamber and the lid is hinged to the outside of the cylinder such that the lid may be lifted off the top of the cylinder when it is required to clean the inside of the chamber or exchange homogenizer members. The lid is lifted by means of a hydraulic ram positioned against the hinge.

In order to retrofit existing stuffing machines of the prior art with the combination homogenizer-vacuum loader apparatus of this invention, the conical hopper of the prior art machine is removed and the homogenizer is set on top of the machine with the exit port of the chamber aligned with an entrance port to the stuffing machine where the conical hopper was originally located. The entrance port to the stuffing machine is typically a vertical cylinder having a flat surface with an opening on its upper end. The joint between the exit port of the homogenizer and the entrance port of the stuffing machine must be sealed by a vacuum tight seal.

In one embodiment, the seal is a flat gasket interposed between a bottom surface of the exit port and the top surface at the entrance port to the stuffing machine. The heavy weight of the homogenizer and uneven distribution of the weight around the gasket results in a large uneven force distribution that reduces reliability of a simple flat gasket for this application. A second embodiment of this invention includes a mating ring that provides for a more reliable vacuum seal between the homogenizer and stuffing machine.

In the ring seal construction, the homogenizer is supported on the stuffing machine by metal to metal contact while a first elastomeric seal is interposed in a stepped groove between the upper surface of the ring and lower surface of the homogenizer. This arrangement ensures that the compressive force on the elastomeric seal will be uniform. The step construction of the groove permits use of a thicker elastomeric seal and therefore an elastomeric material with greater compressibility than is the case of a construction utilizing a simple flat gasket. The mating ring has a collapsible joint that permits the ring to fit outside the lip of the entrance to any one of stuffing machines whose entrances have slightly different dimensions. A second elastomeric seal is interposed between the ring and outside cylindrical surface of the entrance to the stuffing machine. A third elastomeric seal is interposed in the collapsible joint in contact with the first and second seals and prevents leakage at the joint. All of these features provide improved reliability of the vacuum seal of the ring seal compared to the flat gasket.

A number of constructions may be considered for the frame supporting the homogenizer which must include means for lifting the homogenizer front the stuffing machine for repairs, cleaning etc. Possible arrangement include extensible legs or a hoist above the homogenizer that simply lifts the homogenizer vertically away from the stuffing machine. These arrangements have the drawbacks that additional space above the homogenizer is required that might not be available and the expense of such constructions tend to be excessive.

A feature of this invention which avoids these problems is a frame including a support for the homogenizer that is hingably attached to the base of the frame. The stuffing machine may be rolled into position under the homogenizer where it is straddled by the frame base. The hinged support is then rotated so that the exit port of the homogenizer is in aligned contact with the entrance port of the stuffing machine. Rotation of the hinged support and homogenizer is powered by a hydraulic ram attached to the frame base.

Parameters of the homogenizing operation such as speed of rotation of the agitator assembly, time of homogenizing, and the actual homogenizer attached to the agitator assembly are selected according to the nature of the meat product, such as fat and moisture content, nature of the meat fiber, etc. Optimum homogenization of meat product is determined in terms of achieving a desired consistency, improved color, absence of holes, longer shelf life, etc. Shelf life can be doubled by optimum homogenizing conditions.

DRAWINGS

DESCRIPTION OF THE PREFERRED EMBODIMENT

The following detailed description illustrates the invention by way of example, and not by way of limitation of the principles of the invention. This invention will clearly enable one skilled in the art to make and use the invention and describes embodiments, adaptations, and uses including what I presently believe is the best mode for carrying out the invention.

Figure 1:
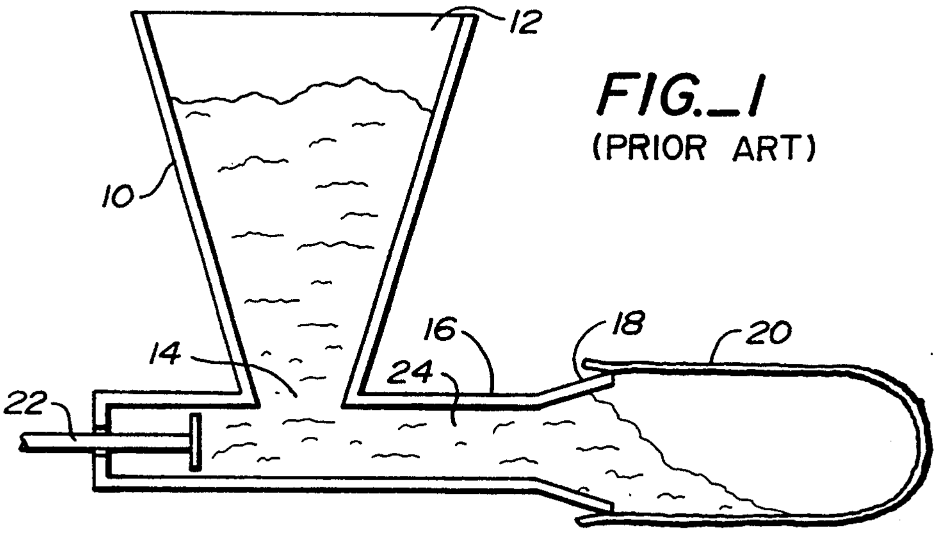
FIG. 1 (PRIOR ART)
FIG. 1 is a sectional view of the first type of prior art machine for stuffing meat product into a casing using a ram.
Figure 2:
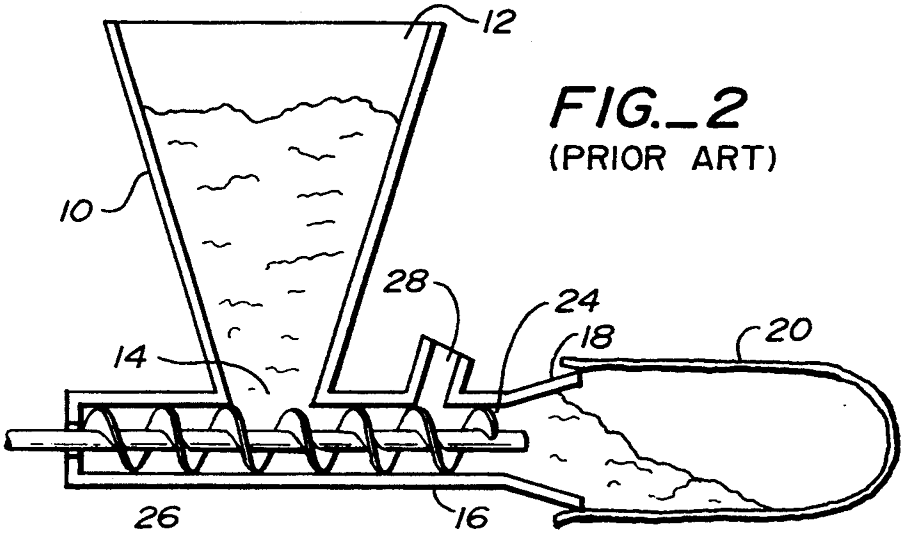
FIG. 2 (PRIOR ART)
FIG. 2 is a sectional view of the next generation machine which evacuated the casing and drew the meat product toward the casing by vacuum source located close to the horn.
Figure 3:
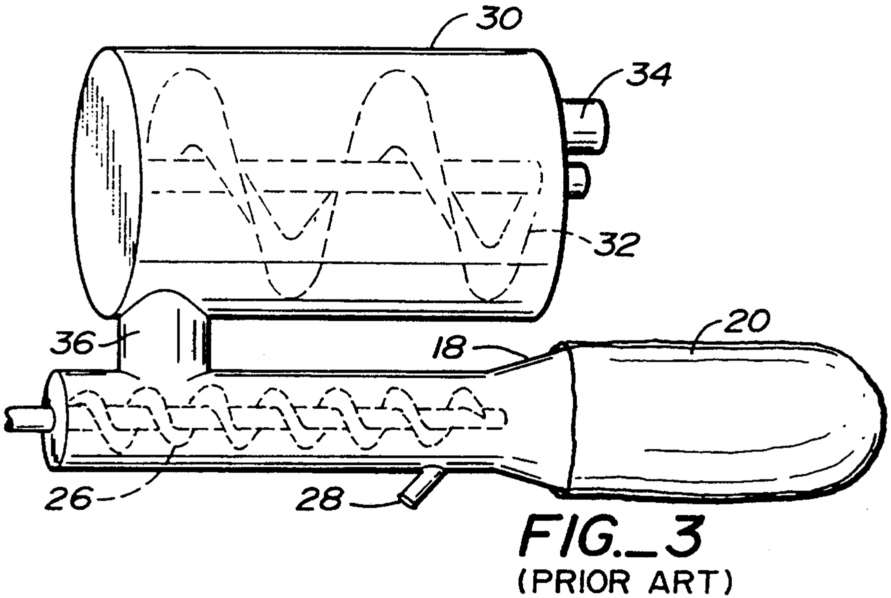
FIG. 3 (PRIOR ART)
FIG. 3 shows the next generation machine that used vacuum to load the meat product into the hopper and a screw to transfer the meat product from the hopper to the vane pump.
Figure 4:
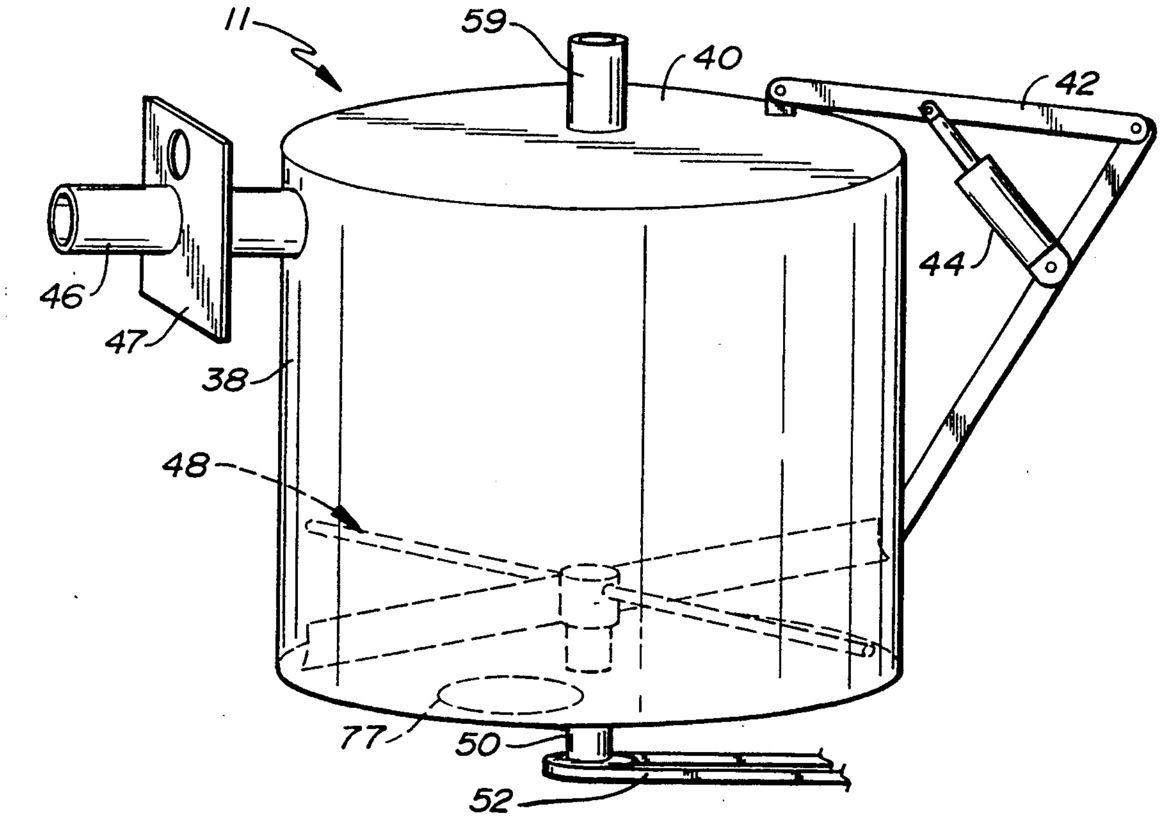
FIG. 4 shows the homogenizer apparatus of this invention.

Turning now to the drawings, FIG. 1 shows a sectional view of the operating principles of the first meat product stuffing machines. There is shown a conical loading hopper 10 with the top opening 12 where the meat product is loaded into the machine and the hopper exit port 14 where the meat product leaves the conical hopper 10 to enter the loading cylinder 16. One end of the loading cylinder 16 has a flared horn 18 which mates to the opening of a casing 20 . At the other end of the loading cylinder 16 is an air actuated ram 22 which forces the ground meat 24 into the casing 20. FIG. 2 shows a sectional view of the next generation machine which introduces vacuum loading of the meat product into the casing. A vane pump or screw 26 has replaced the ram 22 of FIG. 1 to drive the meat product into the casing 20. A port 28 is located close to the horn which facilitates loading the casing 20 by evacuating the casing 20 and helping to draw the meat product from the conical loading hopper 10 down into the entrance 58 of the loading cylinder 16. FIG. 3 illustrates the third generation machine which features vacuum loading of the ground meat into the loading hopper 30 in addition to vacuum-aided loading of the casing. The loading hopper is a cylinder 30 with its axis oriented horizontally. Meat product is loaded by vacuum into the cylinder through the entry port 34. The meat product is driven toward the exit 36 of the chamber 30 by screw 32. The casing 20 is stuffed by combined action of a small screw or vane pump 26 and vacuum through port 28 located near the loading horn 18. FIG. 4 shows one embodiment of the homogenizer 11 of meat product which is included in the scope of the present invention. There is shown a cylindrical hopper 38 with a lid 40 that may be lifted off by hinge 42 actuated by hydraulic ram 44 for cleaning and access to the interior chamber of the hopper 38. Meat product is vacuum-loaded into the chamber 38 through a side port 46. An agitator assembly 48 that rotates to homogenize the meat product in cooperation with the vacuum is mounted on a spindle 50.

Figure 5:
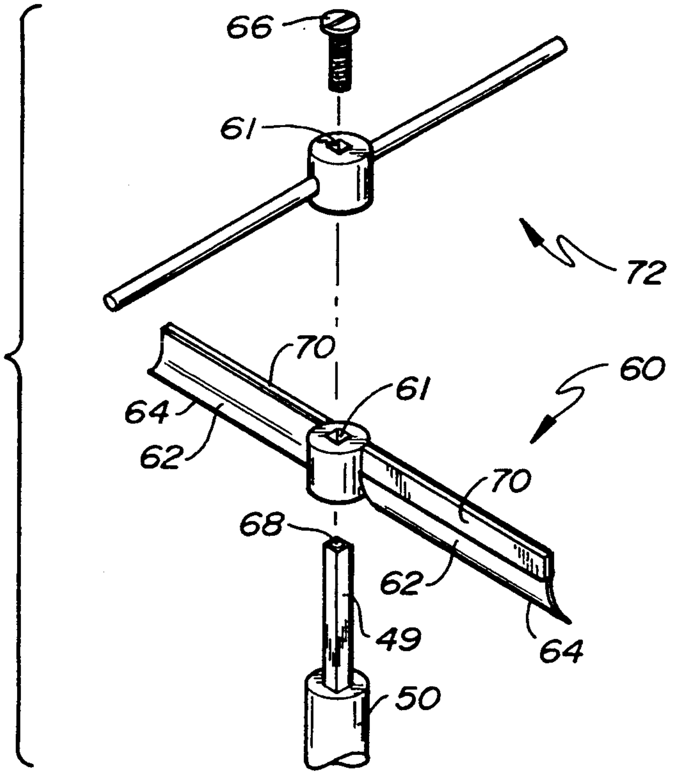
FIG. 5 shows details of the design of the homogenizer member of an agitator intended for meat having average initial consistency.

As shown in FIG. 5, the spindle includes a square end section 49 attached to section 50 , having a circular cross-section which extends through the bottom wall of the hopper 38 and is coupled by belt 52 to a drive motor (not shown). In order to adapt the homogenizer of FIG. 4 to the machine of the prior art shown in FIG. 2, the conical hopper 10 show in FIG. 2 is removed and replaced by the homogenize, 11 FIG. 4, with the exit port 77 in mating alignment with the entrance to the stuffing machine (not shown).

An inlet 59 communicating with a source of vacuum (not shown) is provided for evacuating the chamber and is located in the lid of the hopper 38. The chamber is evacuated typically to twenty-nine inches of mercury.

The entrance port 46 is provided with a sliding gate valve 47. When it is desired to load meat product into the chamber, gate valve 47 is opened so that the vacuum in the chamber draws meat product through the entrance port 46. The valve 47 is then closed to maintain the vacuum in the chamber.

The agitator assembly, shown in the exploded view of FIG. 5, comprises a lower scraper member 60 oriented perpendicularly to an upper homogenizer member 72. Both members have centrally located square mounting holes 61 for attachment to the square end section 49, attached to round section 50 of the spindle, and are secured by screw 66 in threaded hole 68 of the spindle. Scraping member 60 includes a rigid support 70 supporting a slightly flexible scraper blade 62 whose bottom edge 64 is in contact with the chamber floor at all times, and sweeps the homogenized meat product into the exit port 77 in the floor of the chamber which communicates with the entrance to the stuffing machine.

The upper homogenizer member 72 has a square hole 61 through its center that mates with the square end 49 of the spindle. The homogenizer member may therefore be readily separated from the spindle and removed from the chamber. This provides that various designs of homogenizer members can be installed in the homogenizer depending on the consistency mid composition of the meat product to be homogenized. If meat product is excessively agitated, then it becomes "pasty". Various designs of homogenizer members are shown in FIGS. 5 and 6.

The homogenizer member shown in FIG. 5 is simply a bar and is used on meat product having a moderate fat content and moderate juiciness.

If the meat product is very juicy and has little fat, then no homogenizer member would be used and a stud would be placed over the end of the spindle as protection for the threaded hole 68 at the square end section 49 of the spindle.

Figure 6:
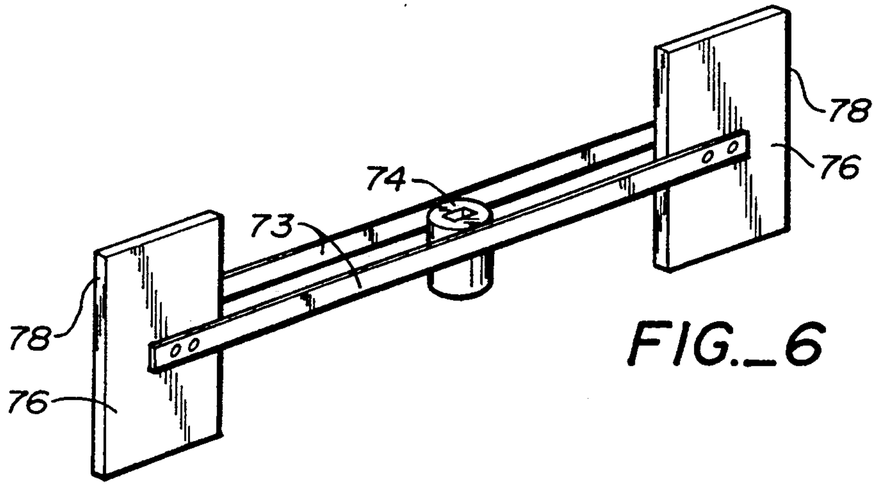
FIG. 6 shows details of the design of a homogenizer member that is useful on meat product having a high fat content.

As shown in FIG. 6 if the meat product is very fat, then a homogenizer member is used that includes outrigger support members 73 mounted on central sleeve 74 and to whose ends are secured wiper members 76. The outer edges 78 of wiper members 76 are in continual contact with the interior cylindrical wall of the chamber so as to prevent any buildup of fat.

The wiper members 62 and scraper blades 76 are made preferably of high density polyethylene.

Figure 7:
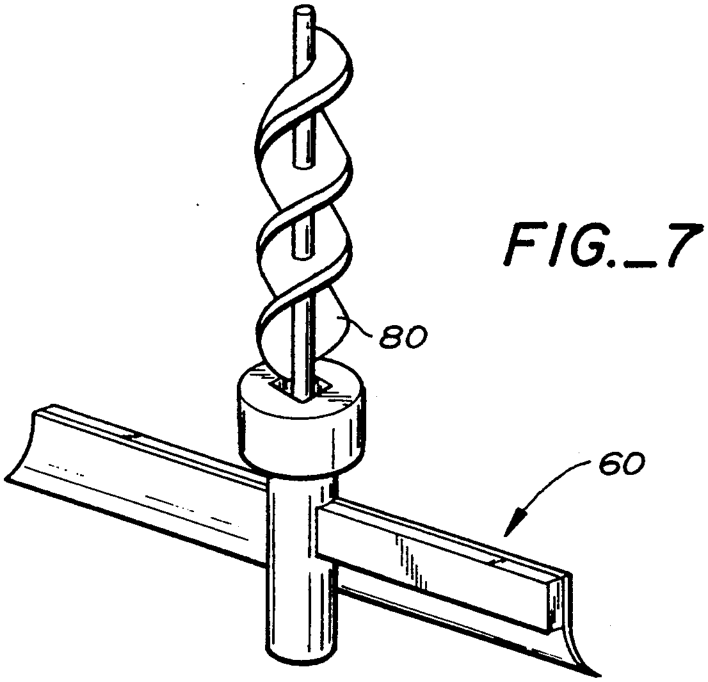
FIG. 7 shows details of a homogenizer member to be used where the initial ground mix has large regions of various consistencies, thereby requiring extensive mixing.

As shown in FIG. 7, if the meat product requires a relatively long time for homogenization, such as when there are large regions of varying composition or consistency, then an auger 80 may be attached to the spindle concentric with the spindle that circulates the meat product tap from the bottom of the chamber.

Another method of controlling the homogenizing action is by adjusting the speed of rotation. Rotational velocity is variable from zero to twenty-five revolutions per minute. Long fiber meat products, such as those containing beef, are typically homogenized in the lower range of rotational velocity. Short fiber meat products, such as those containing chicken, are typically homogenized in the higher range of rotational velocity.

An important requirement of this invention is the ability to adapt the homogenizer to meat product stuffing machines of the type shown in FIGS. 1 and 2. For this purpose, the original conical hopper of the machine is removed.

Figure 8:
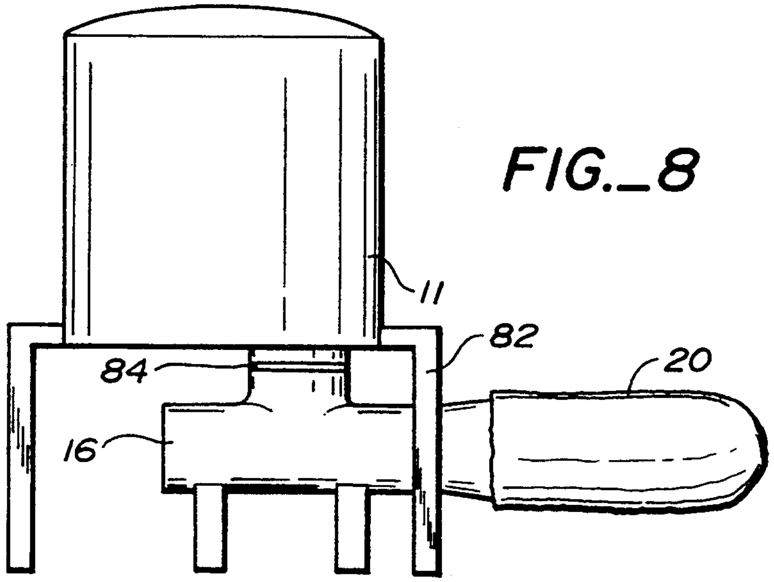
FIG. 8 shows the combination homogenizer-vacuum loader of this invention retrofitted to an existing machine.

In one arrangement, shown in FIG. 8, the homogenizer 11 is supported on a frame 82 and positioned on top of the machine of the prior art to be retrofitted with the exit opening of the homogenizer communicating directly with the entrance opening of the machine to be retrofitted. A metal ring 84 supports a rubber gasket (not shown) interposed between the outer surfaces of the homogenizer and meat product stuffing machine in order to seal the union of homogenizer to meat product stuffing machine and maintain vacuum in the chamber of the homogenizer. The metal ring is typically a part of the meat product stuffing machine. The homogenizer unit is hinged to the frame 82 (hinge not shown) in order that the homogenizer unit may be lifted and positioned onto the stuffing machine 16. An acceptable material for the gasket is neoprene, U.S.D.A.-approved.

The reliability of the vacuum seal shown in FIG. 8 is reduced by the uneven distribution of weight around the gasket resulting in uneven compression of the gasket. The problem is particularly manifested in the initial stage of evacuation where uneven compression results in a small leak around the seal that can only be overcome by the operator applying force manually in the region of suspected leak until the vacuum becomes sufficient to increase force against the seal and close the leak. This inconvenience lengthens the time required for evacuation to take place.

Figure 9:
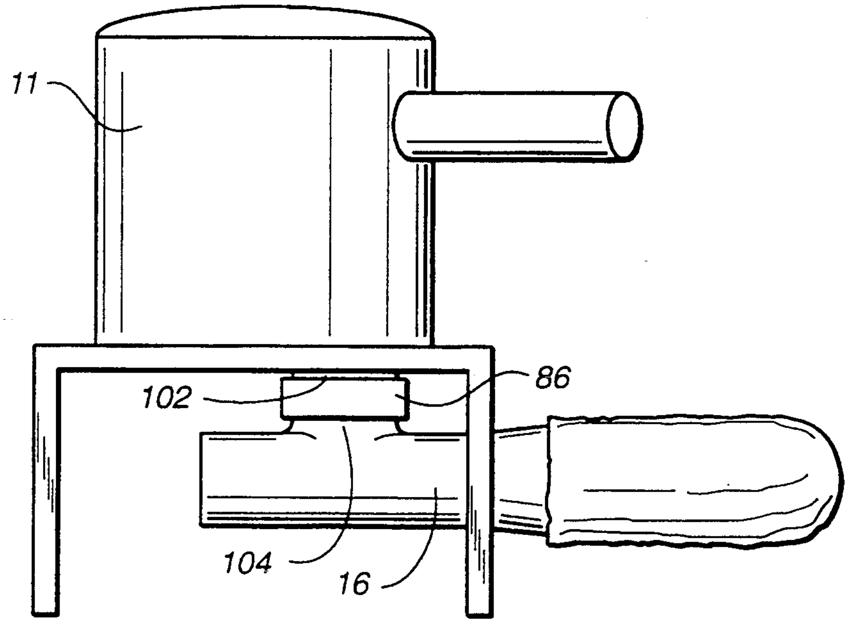
FIG. 9 shows a ring seal positioned between the stuffing machine and homogenizer.
Figure 10:
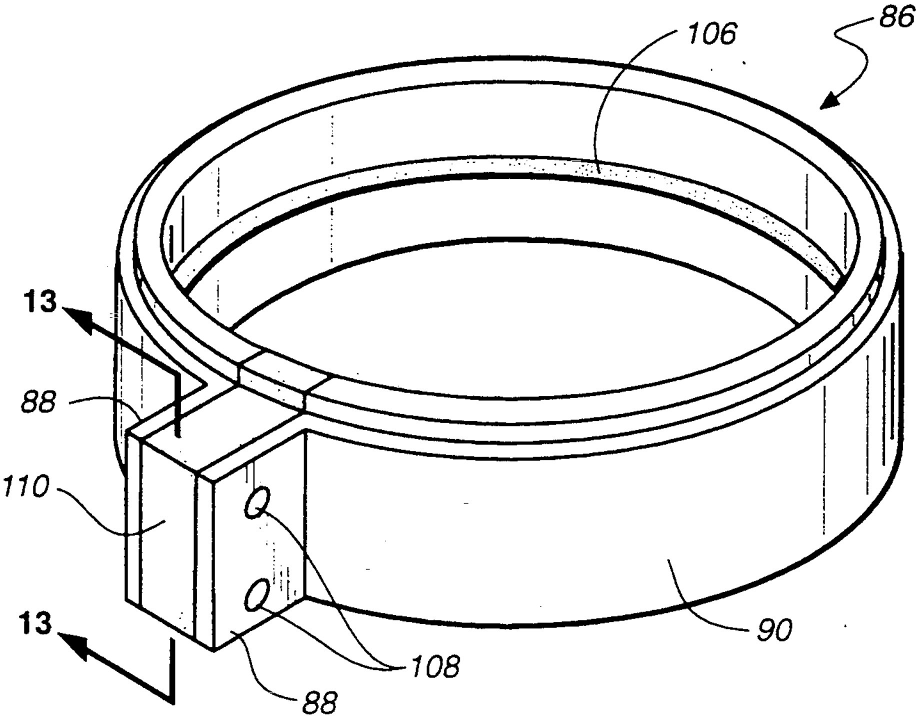
FIG. 10 shows in perspective a view of the ring seal.
Figure 11:
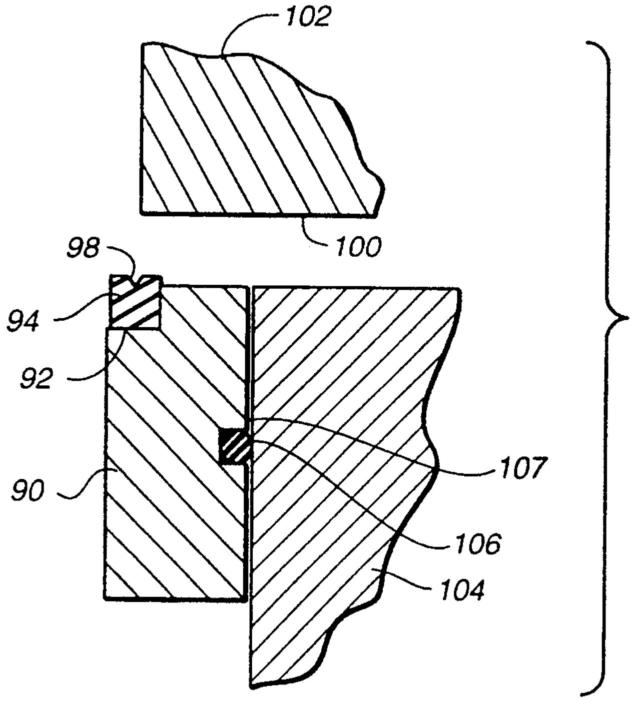
FIG. 11 shows a cross section of the ring seal with the exit port of the homogenizer out of contact with the ring seal.
Figure 12:
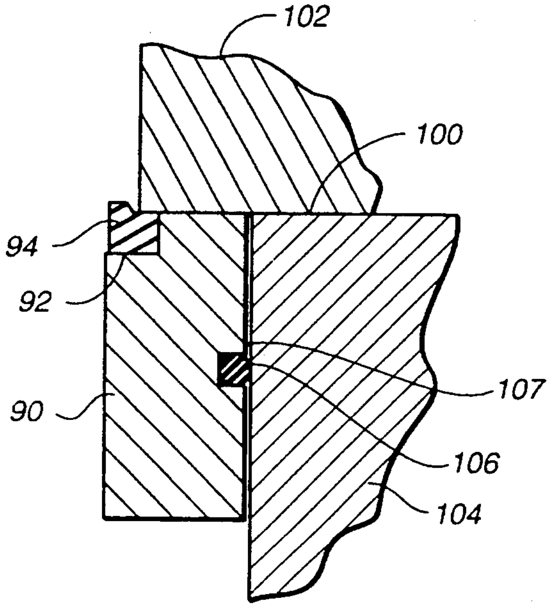
FIG. 12 shows a cross section of the ring seal with the exit port of the homogenizer in contact with the ring seal.

A ring seal 86 that avoids this problem is shown in FIG. 9 positioned between the cylindrical exit port 102 of the homogenizer and cylindrical entrance port 104 of the stuffing machine. FIG. 10 shows the ring seal 86 separately and in greater detail. The ring seal 86 includes a metal ring 90 having a cylindrical inner and outer surface and cut to form two meeting ends joined by flanges 88 facing one another. FIG. 11 shows a cross section of the ring seal 86. An 0-ring 94 is located in a shoulder 92 around the outer corner of the ring 90 . The cross section of the 0-ring 94 shown in FIG. 11 is rectangular with a V groove 98 in its upper surface. An alternate embodiment would be to position the 0-ring 94 in a groove on the top flat surface of the ring 90. A cutaway view of a corner of the exit port 102 with mating surface 100 is shown out of contact with the ring seal in FIG. 11. FIG. 12 shows the mating surface 100 in contact with the top surface of the ring wherein the groove 98 of the 0-ring 94 has been flattened and spread by the weight of the homogenizer. FIG. 12 illustrates that the weight of the homogenizer is supported by the metal cylinder and top surface of the entrance port 104 to the stuffing machine. This arrangement ensures that the compression of the 0-ring is uniform around the ring thereby providing a more reliable vacuum seal than the flat gasket discussed in connection with FIG. 8.

FIGS. 10, 11 and 12 also show a second 0-ring 106 in a circumferential groove 107 around the inside surface of the ring 90. 0-ring 106 prevents leakage of air between the ring seal 86 and the cylindrical entrance 104 to the stuffing machine 16.

Figure 13:
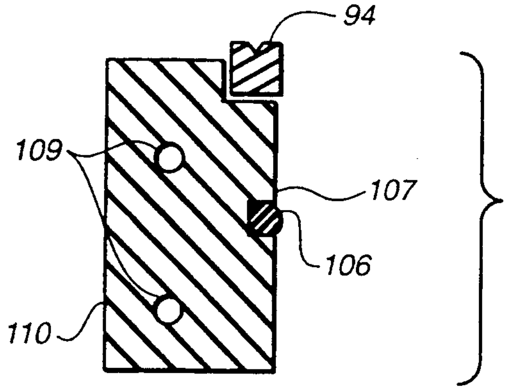
FIG. 13 is a sectional view showing the positional relation between the two 0-rings and flat gasket to effectuate sealing around the flanges.

FIG. 10 also shows a third elastomeric seal 110 interposed between the flanges 88. FIG. 13 is a sectional view along line of sight BB or FIG. 10 and shows the relative position of seal 110, and 0-rings 106 and 94. The third seal 110 provides a collapsible union of the two flanges 88 which are drawn together by fastening means 108 such as drawbolts so that the 0-ring 106 may be drawn snugly around the outside of the entrance port to the stuffing machine while the seal 110 and two 0-rings 106 and 94 combine to prevent leakage around the joined flanges. The flat elastomeric seal 110 is shown in FIG. 13 with holes 109 to accomodate fastening means 108 such as draw bolts.

Figure 14:
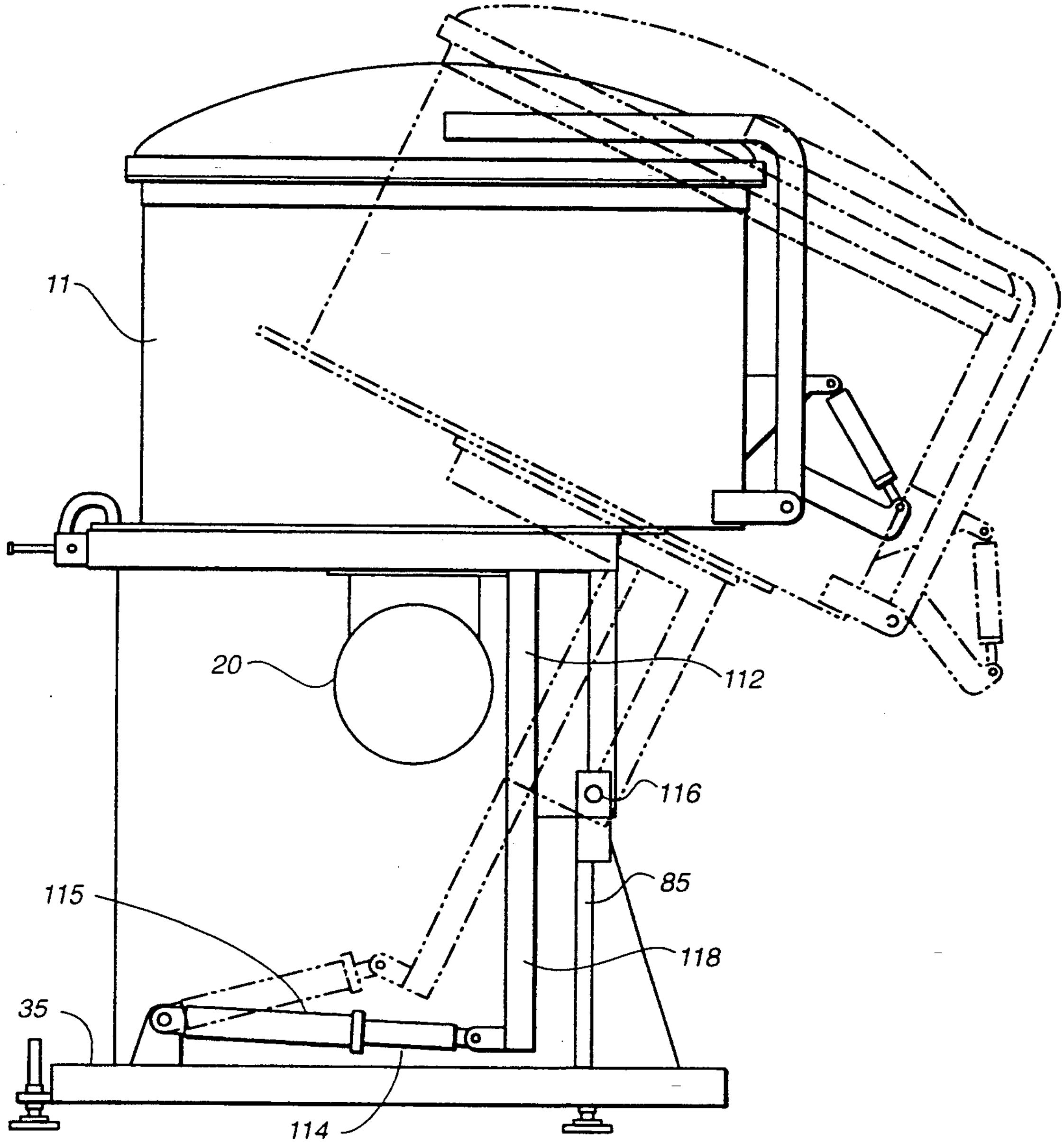
FIG. 14 shows the arrangement of the ram, frame and hinging attachment for positioning the homogenizer into and out of contact with the stuffing machine.

FIG. 14 shows an arrangement by which the homogenizer 11 is lifted off of the stuffing machine 20. The homogenizer is shown in the closed position in which it is in contact with the stuffing machine to perform the homogenizing operation and, in phantom, in the open position in which it is lifted out of contact with the stuffing machine to enable an operator to clean the homogenizer and stuffing machine. The homogenizer 11 is rigidly attached to one end of an arm 112 whose other end is hingably attached to the frame 85 by the hinge 116. An extension 118 from arm I 12 is attached to a ram 114 whose actuating cylinder 115 is attached to the frame 85. Sliding ram 114 rotates the arm 112 so as to lift and rotate the homogenizer 11 from the entrance port 104 to the stuffing machine.

In the foregoing paragraphs, a combination homogenizer-vacuum loader for a meat product stuffing machine has been described which meets the objects of the invention. The apparatus includes a chamber that is evacuated to accomplish the two jobs of loading the meat product and removing air pockets. The apparatus is constructed so that one of several styles of homogenizer members can be conveniently installed to cooperate with the vacuum in the chamber to homogenize the meat product wherein the style of homogenizer member is selected depending on the initial characteristics of the meat product regarding content of moisture, fat, and nature of the fiber. Homogenizing parameters can be further "fine tuned" by selecting an appropriate speed for the revolving agitator. A ring seal between the homogenizer and stuffing machine has been described featuring a combination of three elastomeric members that is a very reliable seal required for generating a vacuum in the chamber. A base frame supports the homogenizer by a hinge construction powered by a hydraulic ram that lifts and rotates the homogenizer when it is desired to lift the homogenizer off of the stuffing machine.

Variations to the embodiments described above may be suggested by reading the specification and studying the drawings. For example the homogenizer housing may comprise an erect conical section with a flat floor and an opening communicating with the ring seal rather than the cylindrical housing that has been described. All such variations are within the scope of this invention. I therefore wish the scope of my invention to be defined by the following claims and by the description in the specification if need be.

I claim:

1. An apparatus for sealing a joint between a first cylinder having a first flat end surface and a second cylinder having a second flat end surface interfacing said first flat end surface, which comprises:

a ring having a flat top end surface and an inner and outer cylindrical surface and cut to form two meeting ends;

said inner cylindrical surface having a first circumferential groove;

a first elastomeric 0-ring positioned in said first circumferential groove:

said top end surface having a second circumferential groove;

a second elastomeric 0-ring positioned in said second circumferential groove;

two flanges, one flange attached to one of said meeting ends and facing said other flange attached to said other meeting end;

a flat elastomeric gasket positioned between said flanges;

a means for fastening said flanges together thereby tightening said ring around said first cylinder with said top end surface coplanar with said first flat end surface permitting said second flat end surface of said second cylinder to be positioned against said first flat end surface of said first cylinder and said top end surface and providing that a vacuum generated in said first and second cylinders is maintained by said first and second O-rings and flat elastomeric gasket and forcing said first and second flat end surfaces against one another.

2. An apparatus as in claim 1 wherein said fastening means comprises at least one drawbolt positioned through each said flange and said flat gasket.

3. An apparatus as in claim 1 wherein said second elastomeric 0-ring has a rectangular cross section bounded by four flat surfaces and a V groove in one of said flat surfaces providing that when said second flat end surface of said second cylinder contacts said flat surface with said V groove, said V groove is flattened.

4. An apparatus as in claim 1 wherein said first cylinder comprises an entrance port to a meat stuffing machine and said second cylinder comprises an exit port to a homogenizer.

5. An apparatus as in claim 4 which comprises:

a frame;

a lever means hingably attached to said frame and secured to said homogenizer in operable combination with said frame, homogenizer and stuffing machine to permit said second cylinder to be oriented to a first position where said first and second end surfaces interface each other and oriented to a second position where said first and second flat end surfaces are separated from one another.

6. An apparatus as in claim 5 which comprises:

a ram housing attached to said frame;

a ram having an end protruding from said ram housing with an end attached to said lever means in operable combination to permit said ram to move said second cylinder between said first and second positions when said ram is actuated.

7. An apparatus as in claim 4 wherein said homogenizer comprises a housing with a floor having an opening communicating with said exit port.

8. An apparatus as in claim 7 wherein said housing comprises an erect homogenizer cylinder in which said floor is a bottom end of said erect homogenizer cylinder.

9. An apparatus as in claim 7 wherein said housing comprises an erect conical section in which said floor is a bottom end of said erect homogenizer conical section.

* * * * *